United States Patent
Porter et al.

(10) Patent No.: US 12,436,180 B2
(45) Date of Patent: Oct. 7, 2025

(54) AUTO SQUELCH ON POWERLINE COMMUNICATIONS (PLC)

(71) Applicant: S&C Electric Company, Chicago, IL (US)

(72) Inventors: David Glenn Porter, East Troy, WI (US); Christine Elizabeth McNeil, West Allis, WI (US)

(73) Assignee: S&C Electric Company, Chicago, IL (US)

( * ) Notice: Subject to any disclaimer, the term of this patent is extended or adjusted under 35 U.S.C. 154(b) by 138 days.

(21) Appl. No.: 18/438,731

(22) Filed: Feb. 12, 2024

(65) Prior Publication Data
US 2024/0377449 A1    Nov. 14, 2024

Related U.S. Application Data

(60) Provisional application No. 63/501,734, filed on May 12, 2023.

(51) Int. Cl.
*G01R 31/08*    (2020.01)
*G01R 31/62*    (2020.01)

(52) U.S. Cl.
CPC .......... *G01R 31/086* (2013.01); *G01R 31/62* (2020.01)

(58) Field of Classification Search
USPC ........................................ 324/512
See application file for complete search history.

(56) References Cited

U.S. PATENT DOCUMENTS 8,665,102 B2 *    3/2014    Salewske ........... G01R 19/2513
340/657

* cited by examiner

*Primary Examiner* — Farhana A Hoque

(57) ABSTRACT

A system and method for determining a squelch level for each transformer in a series of transformers connected to a power line that communicate with each other through PLC. The method includes selectively transmitting a PLC test message by each transformer on the power line both upstream and downstream of the transmitting transformer to determine that the transmitting transformer can communicate with other transformers; responding to the PLC test message that is received by each transformer to identify the transformers that can communicate with the transmitting transformer; measuring the RSSI of the PLC messages that each transformer receives; recording the strongest RSSI in each transformer of the PLC messages that are received by the transformer; and setting the squelch level for each transformer as a predetermined reduction of the recorded RSSI in each transformer.

20 Claims, 2 Drawing Sheets

AUTO SQUELCH ON POWERLINE COMMUNICATIONS (PLC)

CROSS-REFERENCE TO RELATED APPLICATION

This application claims the benefit of priority from the U.S. Provisional Application No. 63/501,734, filed on May 12, 2023, the disclosure of which is hereby expressly incorporated herein by reference for all purposes.

BACKGROUND

Field

The present disclosure relates generally to a system and method for determining a squelch level for each transformer in a series of transformers connected to a power line that communicate with each other through powerline communications (PLC).

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three-phase feeders including three single-phase feeder lines that carry the same current but are 120° apart in phase. three-phase and single-phase lateral lines are tapped off of the feeder that provide the medium voltage to various distribution transformers, where the voltage is stepped down to a low voltage and is provided to loads, such as homes, businesses, etc.

Periodically, faults occur in the distribution network as a result of various things, such as animals touching the lines, lightning strikes, tree branches falling on the lines, vehicle collisions with utility poles, etc. Faults may create a short-circuit that increases the stress on the network, which may cause the current flow to significantly increase, for example, many times above the normal current, along the fault path. This amount of current causes the electrical lines to significantly heat up and possibly melt, and also could cause mechanical damage to various components in the network. These faults are often transient or intermittent faults as opposed to a persistent or bolted fault, where the thing that caused the fault is removed a short time after the fault occurs, for example, a lightning strike. In such cases, the distribution network will almost immediately begin operating normally after a brief disconnection from the source of power.

Power distribution networks of the type referred to above typically include switching devices, breakers, reclosers, current interrupters, etc. that control the flow of power throughout the network. Standalone pad mounted and underground switchgear including electrical disconnect switches, fuses and/or circuit breakers used to control, protect and isolate electrical equipment are often employed to de-energize equipment to allow work to be done and to clear faults.

Some power distribution networks may employ underground single-phase lateral circuits that feed residential and commercial customers. Often times these circuits are configured in a loop and fed from power sources at both ends, where an open circuit location in the loop isolates the two power sources. Transformers are dispersed along the loop that each service loads, where the open circuit location is typically provided at one of the transformers. A single-phase line is coupled to the primary coil in each transformer so that current flows to the primary coils along the loop.

It has been proposed in the art to provide a switching device, sometimes referred to as a bushing well interrupter (BWI), at the source side and the load side of each transformer in these underground networks between the primary coil and the line that includes, for example, a vacuum interrupter. The two switching devices for each transformer can be controlled by a common control unit. The network may employ a fault isolation and protection scheme where faults are detected and the devices nearest both sides of the fault open to isolate the faulted line segment. In one known fault isolation and protection scheme, the control units are in communication with each other through powerline communications (PLC), where messages are transmitted between and among the transformers on the line that is used for power transmission.

The PLC signals are modulated onto the power line by the control units at a certain frequency that is higher than the frequency of the power signal and at a certain magnitude or intensity level. The control units detect and process signals on the power line at the certain frequency and that have a magnitude above a predetermined receive signal strength indicator (RSSI), referred to herein as the squelch level, where signal levels below the predetermined RSSI are ignored by the control unit receiving them. The PLC signals are attenuated as they propagate along the power line, where that attenuation increases as the power line ages, and where other factors, such as different cable size, insulation configuration, voltage, capacitance to ground at the transformer, etc., also affect signal attenuation. Further, the PLC signals are coupled through a capacitor from the power line to the control unit. When a switching device is open, the capacitance across the vacuum interrupter contacts is similar to the capacitance of the capacitor between the power line and the control unit so that the PLC signal does pass through the open switching device, but is attenuated, for example, on the order of 30 dBμV, and possibly received by control units downstream of the open switching device. As a rule of thumb, a PLC signal is attenuated about the same when it passes through an open switching device as it does traveling along about 2000 feet of power line cable.

For some fault isolation and protection schemes, it is desirable that the PLC signal drops below the squelch level of a switching device when the signal passes through an open switching device so that the signal is not processed by downstream transformers. To accomplish this, the squelch level that a certain control unit will use to process or ignore PLC signals as required by the fault isolation and protection scheme algorithm is sensitive to the factors that attenuate the signal referred to above. Because of security and other concerns, when the control units are programmed and then placed in the field they cannot be reprogrammed thereafter. Even if the squelch levels can be programmed, it is desirable to not require programming of the squelch level in the field. Therefore, if the squelch level of a certain control unit needs to be changed, a new control unit is required.

SUMMARY

The following discussion discloses and describes a system and method for determining a squelch level for each transformer in a series of transformers connected to a power line that communicate with each other through PLC, where the squelch level is a certain RSSI of a PLC message received by a transformer where the transformer will act on the received PLC message if its RSSI is above or equal to the squelch level and will ignore the received PLC message if its RSSI is below the squelch level. The method includes selectively transmitting a PLC test message by each transformer on the power line both upstream and downstream of the transmitting transformer to determine that the transmitting transformer can communicate with other transformers; responding to the PLC test message that is received by each transformer to identify the transformers that can communicate with the transmitting transformer; measuring the RSSI of the PLC messages that each transformer receives; recording the strongest RSSI in each transformer of the PLC messages that are received by the transformer; and setting the squelch level for each transformer as a predetermined reduction of the recorded RSSI in each transformer.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method for determining a squelch level for each transformer in a series of transformers connected to a power line that communicate with each other through powerline communications (PLC) is merely exemplary in nature, and is in no way intended to limit the invention or its applications or uses. For example, as mentioned, the system and method have particular application for use in an underground loop circuit. However, the system and method may have other applications.

Figure 1:
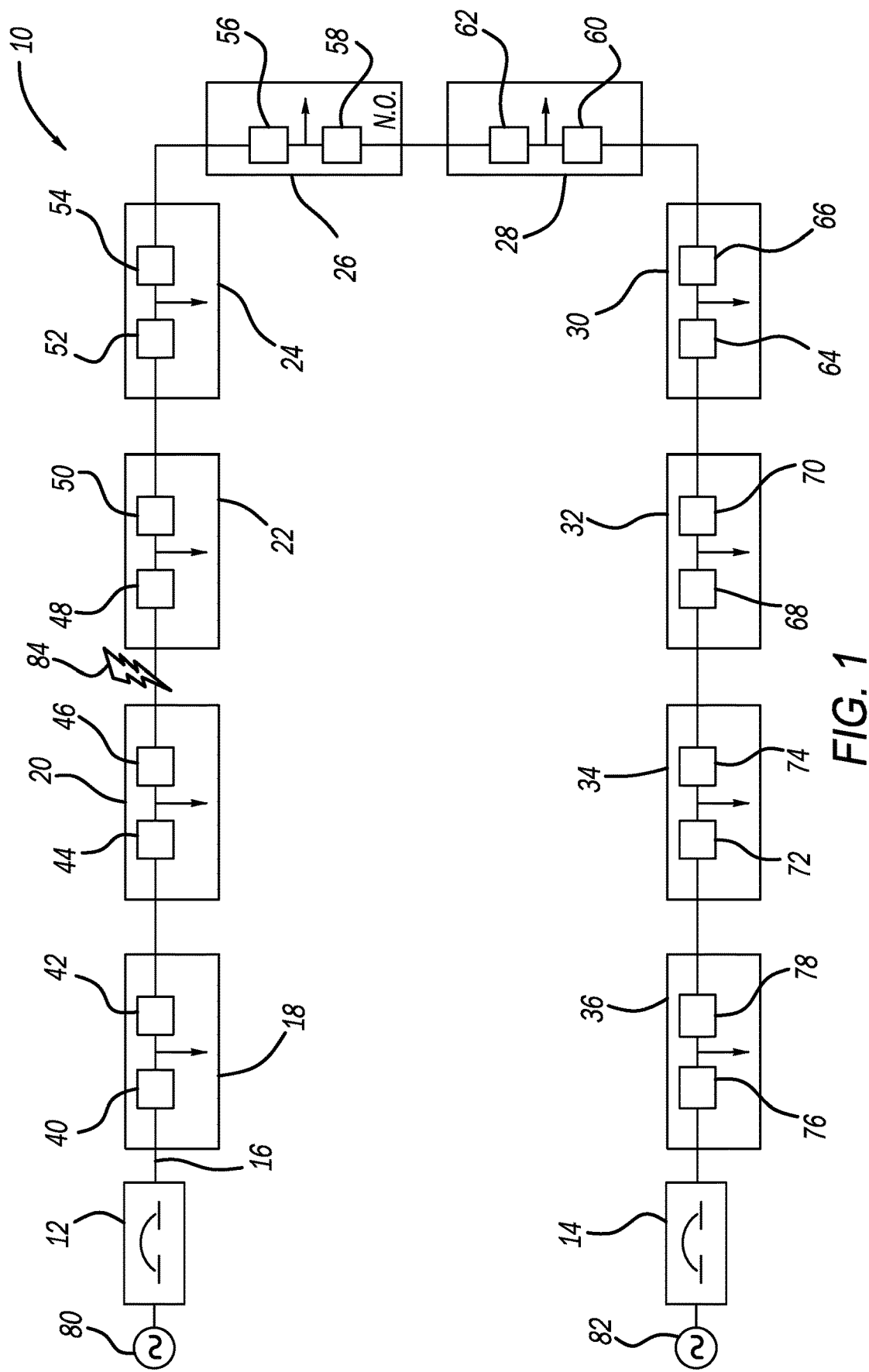
FIG. 1 is a simplified schematic diagram of an underground power distribution network including a series of transformers each having a pair of switching devices.

FIG. 1 is a simplified schematic diagram of an underground power distribution network 10 that is fed with power from both ends by power sources 80 and 82, for example, a feeder, substation, etc. The network 10 includes, for example, two single-phase, self-powered, reclosers 12 and 14 connected to the power sources 80 and 82, or other source of power, at the head ends of the network 10, an underground distribution power line 16 and ten transformers 18, 20, 22, 24, 26, 28, 30, 32, 34 and 36 coupled along the line 16. Each transformer 18-36 includes a source side towards the source of power and a load side towards a normally open point (58 below) in the line 16. The transformer 18 includes source side and load side switching devices 40 and 42, respectively, the transformer 20 includes source side and load side switching devices 44 and 46, respectively, the transformer 22 includes source side and load side switching devices 48 and 50, respectively, the transformer 24 includes source side and load side switching devices 52 and 54, respectively, the transformer 26 includes a source side switching device 56 and a normally open (NO) switching device 58, the transformer 28 includes source side and load side switching devices 60 and 62, respectively, the transformer 30 includes source side and load side switching devices 64 and 66, respectively, the transformer 32 includes source side and load side switching devices 68 and 70, respectively, the transformer 34 includes source side and load side switching devices 72 and 74, respectively, and the transformer 36 includes source side and load side switching devices 76 and 78, respectively. The switching device 58 is normally open to provide electrical isolation between the sources 80 and 82. The switching devices 40-78 can be any switching device suitable for the purposes discussed herein, such as the BWIs referred to above.

Figure 2:
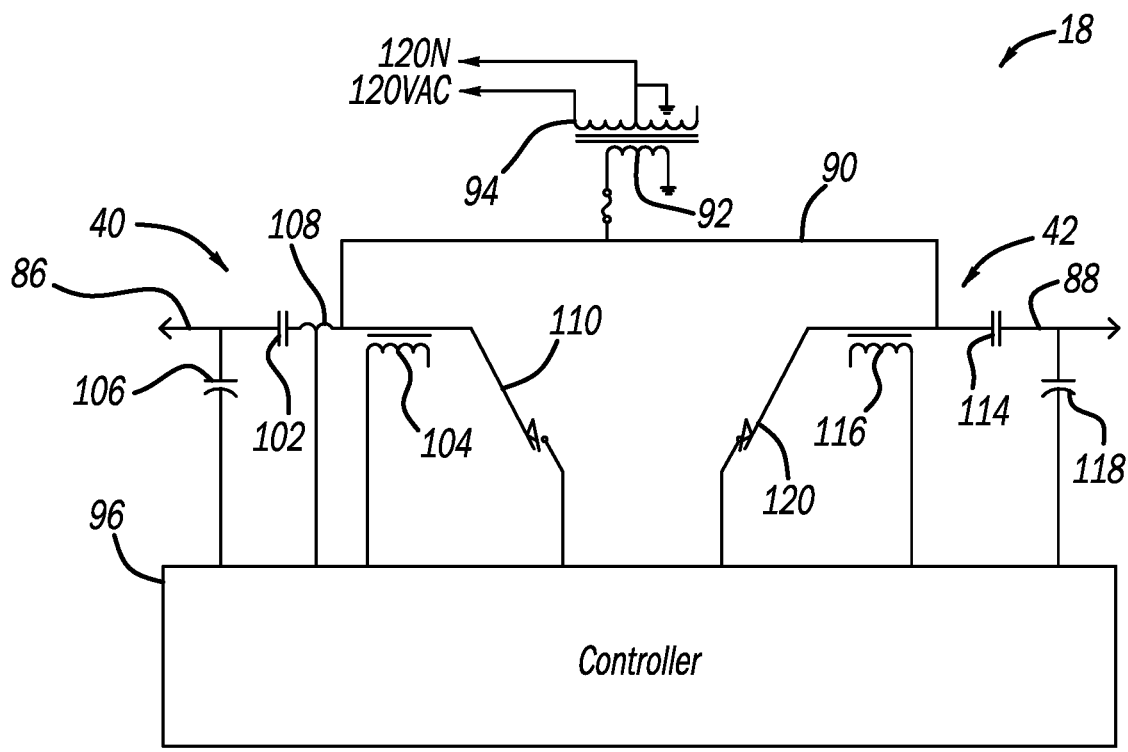
FIG. 2 is a simplified schematic diagram of one of the transformers.

FIG. 2 is a schematic type diagram of the transformer 18 as representative of all of the transformers 18-36. The transformer 18 includes a cable 86 that is connected to the power line 16 at the source side of the transformer 18, a cable 88 that is connected to the power line 16 at the load side of the transformer 18 and a cable 90 that is connected to the cables 86 and 88. The transformer 18 also includes a primary coil 92 that receives the medium voltage power on the cable 90 and a secondary coil 94 that provides 120 VAC line to neutral, 120 N and 240 VAC line to line to loads (not shown). The switching device 40 includes a vacuum interrupter 102, an actuator 104, a high voltage capacitor 106, a current sensor 108 for measuring current on the power line 16 and a manual handle 110 for manually opening and closing the switching device 40. Likewise, the switching device 42 includes a vacuum interrupter 114, an actuator 116, a high voltage capacitor 118 and a manual handle 120 for manually opening and closing the switching device 42. A controller 96 is responsive to the current and voltage measurement signals and controls the vacuum interrupters 102 and 114 and the actuators 104 and 116. The controller 96 also puts PLC messages on and receives messages from the cable 86 through the capacitor 106 at the cable side of the switching device 40 and puts PLC messages on and receives messages from the cable 88 through the capacitor 118 at the cable side of the switching device 42 consistent with the discussion herein.

The network 10 employs a fault isolation and protection scheme that generally operates as follows. If a fault 84 occurs in the line segment between, for example, the transformers 20 and 22, the transformers 18 and 20 will see overcurrent, the transformers 22 and 24 will see sagging voltage, but no overcurrent, and the transformer 26 will see sagging voltage on its normally closed vacuum interrupter in the switching device 56, but no overcurrent. The recloser 12 will open as a result of the over current and remain open, for example, for five seconds. During this time, the transformers 18 and 20 see loss of voltage and record a single overcurrent event and the transformers 22 and 24 see loss of voltage. When the recloser 12 closes, and assuming the fault 84 is still there, the transformers 18 and 20 again will see overcurrent, the transformers 22 and 24 will see sagging or loss of voltage and the transformer 26 will see sagging or loss of voltage on its normally closed vacuum interrupter in the switching device 56. The recloser 12 will open again, and since the transformers 18 and 20 saw overcurrent again followed by a loss of voltage, they will open their load side switching devices 42 and 46, and will both send clear to close over current PLC messages upstream towards the source 80. The PLC message from the transformer 20 will be sent from the source side and the message is received from the load side of the transformer 18. Since the transformer 18 received the clear to close over current message, it knows that the fault 84 is downstream of the transformer 20, and thus will close its switching device 42 while the recloser 12 is still open. The transformer 20 did not receive a clear to close over current message since the fault 84 is not downstream of the transformer 22, and so it keeps the switching device 46 open. The recloser 12 closes again and since the switching device 46 is open, the recloser 12 does not measure overcurrent and remains closed.

After a certain time period that the transformers 22 and 24 measure loss of voltage and with no overcurrent events, the transformers 22 and 24 will open their source side switching devices 48 and 52 and send clear to close PLC messages downstream away from the source 80. Since the transformers 24 and 26 received the clear to close message, they know that a transformer is between them and the loss of voltage caused by the fault 84, and thus the transformer 24 will close the switching device 52 and the transformer 26 will close the normally open switching device 58. Thus, the fault 84 is isolated between the open switching devices 46 and 48, and the transformers 22, 24 and 26 now receive power from the source 82. Once the fault 84 is removed, the network 10 can be returned to its normal configuration.

When the over current and clear to close PLC messages are sent upstream and downstream on the power line 16 from a particular transformer in the scenario described above, the messages will be put on the power line 16 at the upstream or the downstream side of an open switching device by the controller 96 and will be received by the controller 96 at the upstream side or the downstream side of an open switching device at the next transformer so that the message does not go through an open switching device before it is received by the controller 96. It is desirable in the scenario described above that the attenuation of the message as it propagates along the power line 16 to the next transformer be such that the RSSI of the message is above the squelch level at the next transformer so that transformer can act on the message as described. It is also desirable in the scenario described above that the attenuation of the message after it passes through the open switching device in that next transformer be such that the RSSI of the message is below the squelch level when it reaches the following transformer so that transformer does not act on the message. However, the distance between the transformers, the type and age of the power lines, etc. provide different attenuation levels of the PLC messages as they travel between the transformers, which may present a potential problem if the same squelch level is used in all of the transformers. When the transformers send a PLC message, they also send their address, which is used when the network 10 is returning to its normal configuration when the fault 84 is removed and the voltage is restored. Power restoration occurs when the fault 84 is removed and the voltage returns, and the switching device 46 is closed. The transformer 22 initiates an automatic return to normal mode after a five minute delay to verify the power is stable.

This disclosure describes a fault isolation and protection scheme that has particular application for an underground power distribution network of the type described above that selectively assigns a PLC message squelch level for each transformer based on the distances between neighboring transformers and other factors of the network. The scheme includes employing a ping test where a PLC ping test message having an appropriate strength level is transmitted on both the source side and the load side of each transformer and then that transformer listens for return messages from the other transformers that received the message that was broadcast to verify that the PLC is operating properly. Each transformer also responds or replies to PLC ping test messages that it receives from other transformers.

Each transformer measures the RSSI of the messages it receives that are responses from its test message and test messages transmitted by the other transformers. Each transformer records the highest RSSI of those messages, which is likely from a transformer the recording transformer wants to communicate with, i.e., a neighboring transformer. The squelch level for the particular transformer is then set at a predetermined value that is less than the recorded RSSI, where that value is based on the attenuation of a message that would occur if the PLC message went through an open switching device. In one non-limiting embodiment, the RSSI reduction value is 15 dBμV. Therefore, each transformer stores a unique squelch level that is determined for that transformer based on its location in the network, for example, the distance from neighboring transformers, and other factors as described herein. Further, after the squelch levels are determined, during a fault isolation and restoration process such as described above, a PLC message that is received by a transformer that is above the squelch level for that transformer will not have passed through an open switching device and a PLC message that is received by a transformer that is below the squelch level for that transformer may have passed through an open switching device.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for determining a squelch level for each transformer in a series of transformers connected to a power line that communicate with each other through powerline communications (PLC), the squelch level being a certain receive signal strength indicator (RSSI) of a PLC message received by a transformer where the transformer will act on the received PLC message if its RSSI is above the squelch level and will ignore the received PLC message if its RSSI is below the squelch level, the method comprising:
   selectively transmitting a PLC test message by each transformer on the power line both upstream and downstream of the transmitting transformer to determine that the transmitting transformer can communicate with other transformers;
   responding to the PLC test message that is received by each transformer to identify the transformers that can communicate with the transmitting transformer;
   measuring the RSSI of the PLC messages that each transformer receives;
   recording the strongest RSSI in each transformer of the PLC messages that are received by the transformer; and
   setting the squelch level for each transformer as a predetermined reduction of the recorded RSSI in each transformer.

2. The method according to claim 1 wherein each transformer includes an upstream switching device and a downstream switching device.

3. The method according to claim 2 wherein the predetermined reduction of the recorded RSSI is based on how much a PLC message will be attenuated by going through an open switching device.

4. The method according to claim 3 wherein the predetermined reduction is 15 dBμV.

5. The method according to claim 2 wherein the switching devices are selectively opened and closed in response to a fault so as to isolate the fault.

6. The method according to claim 2 wherein the switching devices include a vacuum interrupter.

7. The method according to claim 1 wherein measuring the RSSI of the PLC messages that each transformer receives includes measuring the RSSI of PLC messages that are responses to transmitted PLC test messages from other transformers.

8. The method according to claim 1 wherein measuring the RSSI of the PLC messages that each transformer receives includes measuring the RSSI of PLC messages that are PLC test messages transmitted by other transformers.

9. The method according to claim 1 wherein the series of transformers are part of a loop power distribution network.

10. A method for determining a squelch level for each transformer in a series of transformers connected to a power line that are part of a loop power distribution network and communicate with each other through powerline communications (PLC) for fault isolation and power restoration purposes, each transformer including an upstream switching device and a downstream switching device, the squelch level being a certain receive signal strength indicator (RSSI) of a PLC message received by a transformer where the transformer will act on the received PLC message if its RSSI is above the squelch level and will ignore the received PLC message if its RSSI is below the squelch level, the method comprising:
selectively transmitting a PLC test message by each transformer on the power line both upstream and downstream of the transmitting transformer to determine that the transmitting transformer can communicate with other transformers;
responding to the PLC test message that is received by each transformer to identify the transformers that can communicate with the transmitting transformer;
measuring the RSSI of the PLC messages that each transformer receives;
recording the strongest RSSI in each transformer of the PLC messages that are received by the transformer; and
setting the squelch level for each transformer as a predetermined reduction of the recorded RSSI in each transformer, wherein the reduction is based on how much a PLC message will be attenuated by going through an open switching device.

11. The method according to claim 10 wherein the predetermined reduction is 15 dBµV.

12. The method according to claim 10 wherein measuring the RSSI of the PLC messages that each transformer receives includes measuring the RSSI of PLC messages that are responses to transmitted PLC test messages from other transformers.

13. The method according to claim 10 wherein measuring the RSSI of the PLC messages that each transformer receives includes measuring the RSSI of PLC messages that are PLC test messages transmitted by other transformers.

14. A system for determining a squelch level for each transformer in a series of transformers connected to a power line that communicate with each other through powerline communications (PLC), the squelch level being a certain receive signal strength indicator (RSSI) of a PLC message received by a transformer where the transformer will act on the received PLC message if its RSSI is above the squelch level and will ignore the received PLC message if its RSSI is below the squelch level, the system comprising:
means for selectively transmitting a PLC test message by each transformer on the power line both upstream and downstream of the transmitting transformer to determine that the transmitting transformer can communicate with other transformers;
means for responding to the PLC test message that is received by each transformer to identify the transformers that can communicate with the transmitting transformer;
means for measuring the RSSI of the PLC messages that each transformer receives;
means for recording the strongest RSSI in each transformer of the PLC messages that are received by the transformer; and
means for setting the squelch level for each transformer as a predetermined reduction of the recorded RSSI in each transformer.

15. The system according to claim 14 wherein each transformer includes an upstream switching device and a downstream switching device.

16. The system according to claim 15 wherein the predetermined reduction of the recorded RSSI is based on how much a PLC message will be attenuated by going through an open switching device.

17. The system according to claim 16 wherein the predetermined reduction is 15 dBµV.

18. The system according to claim 15 wherein the switching devices are selectively opened and closed in response to a fault so as to isolate the fault.

19. The system according to claim 14 wherein the means for measuring the RSSI of the PLC messages that each transformer receives measures the RSSI of PLC messages that are responses to transmitted PLC test messages from other transformers.

20. The system according to claim 14 wherein the means for measuring the RSSI of the PLC messages that each transformer receives measures the RSSI of PLC messages that are PLC test messages transmitted by other transformers.

* * * * *